United States Patent [19]

Carroll

[11] Patent Number: 4,479,424
[45] Date of Patent: Oct. 30, 1984

[54] JUICER FOR SEPARATING PULP AND JUICE FROM FRUIT

[75] Inventor: William L. Carroll, Rossmoor, Calif.

[73] Assignee: NCC Engineering, Inc., Seal Beach, Calif.

[21] Appl. No.: 474,541

[22] Filed: Mar. 11, 1983

[51] Int. Cl.³ .............................................. A23N 1/00
[52] U.S. Cl. ........................................ 99/502; 99/504; 100/98 R; 100/116; 100/127; 100/218; 221/182
[58] Field of Search .................. 99/495, 496, 501–505, 99/509, 510; 100/98 R, 45, 102, 126, 215, 218, 245, 116, 247; 198/415, 608, 840; 221/182, 183

[56] References Cited

U.S. PATENT DOCUMENTS

| | | | |
|---|---|---|---|
| 1,888,528 | 11/1932 | Faulds | 99/502 |
| 2,045,856 | 6/1936 | Hoyt et al. | |
| 2,065,271 | 12/1936 | Faulds | |
| 2,365,832 | 12/1944 | Monroe | |
| 2,367,859 | 1/1945 | Fromm | |
| 2,522,800 | 9/1950 | Quiroz | 100/218 |
| 2,705,984 | 4/1955 | Harden | |
| 2,853,107 | 9/1958 | Alexander et al. | |
| 3,103,239 | 9/1963 | Alexander | 99/504 |
| 3,162,114 | 12/1964 | Quiroz | 100/37 |
| 3,279,357 | 10/1966 | Farmer | 100/74 |
| 3,673,952 | 7/1972 | Durbin | 100/98 R |
| 3,827,909 | 8/1974 | Farmer | |
| 4,088,070 | 5/1978 | Montagroni et al. | 99/509 |
| 4,300,448 | 11/1981 | Hayashi et al. | 99/516 |
| 4,421,021 | 12/1983 | Holbrook | 99/495 X |
| 4,421,022 | 12/1983 | Burgin | 100/98 R |

Primary Examiner—Timothy F. Simone
Attorney, Agent, or Firm—Fulwider, Patton, Rieber, Lee & Utecht

[57] ABSTRACT

A juicer for separating pulp and juice from fruit. The juicer comprises an indexing assembly for accepting fruit from a conveyor system and urging the fruit past a cutter to halve the fruit. The cut halves are arranged in opposition to a pair of reamers which remove juice and juice saturated pulp for passage to a pulper assembly. A piston system in the pulper assembly is adapted to compress the juice saturated pulp and contemporaneously discharge compressed pulp. Features include agitators in the conveyor system to facilitate movement of the fruit to the indexing assembly, flexible cups for receiving various sizes of fruit, and operation of the indexing assembly in timed relation to movement of the reamers.

13 Claims, 11 Drawing Figures

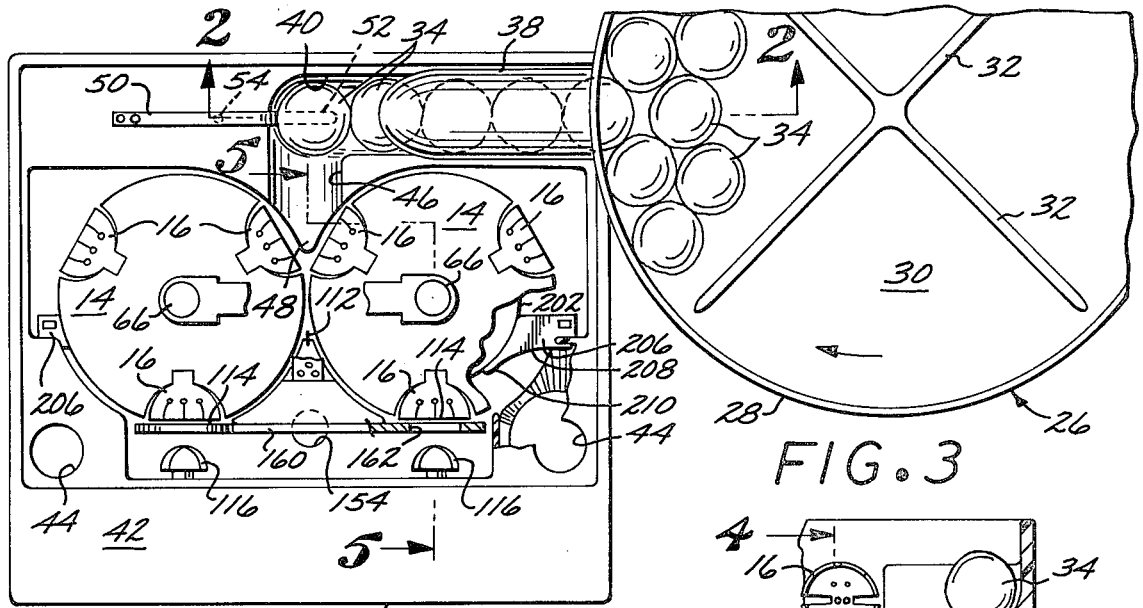
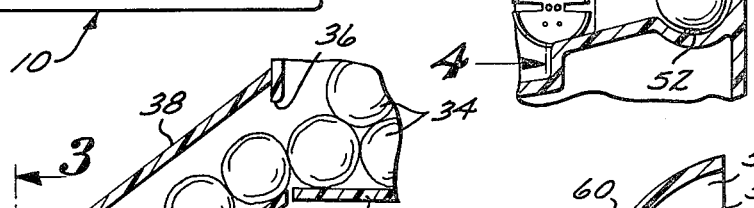
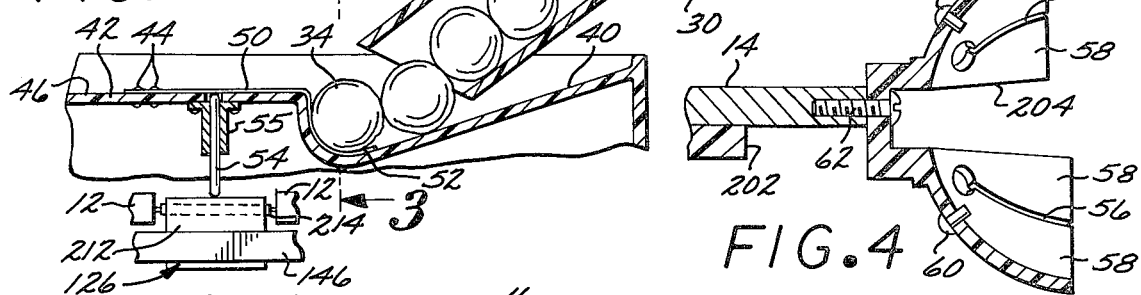
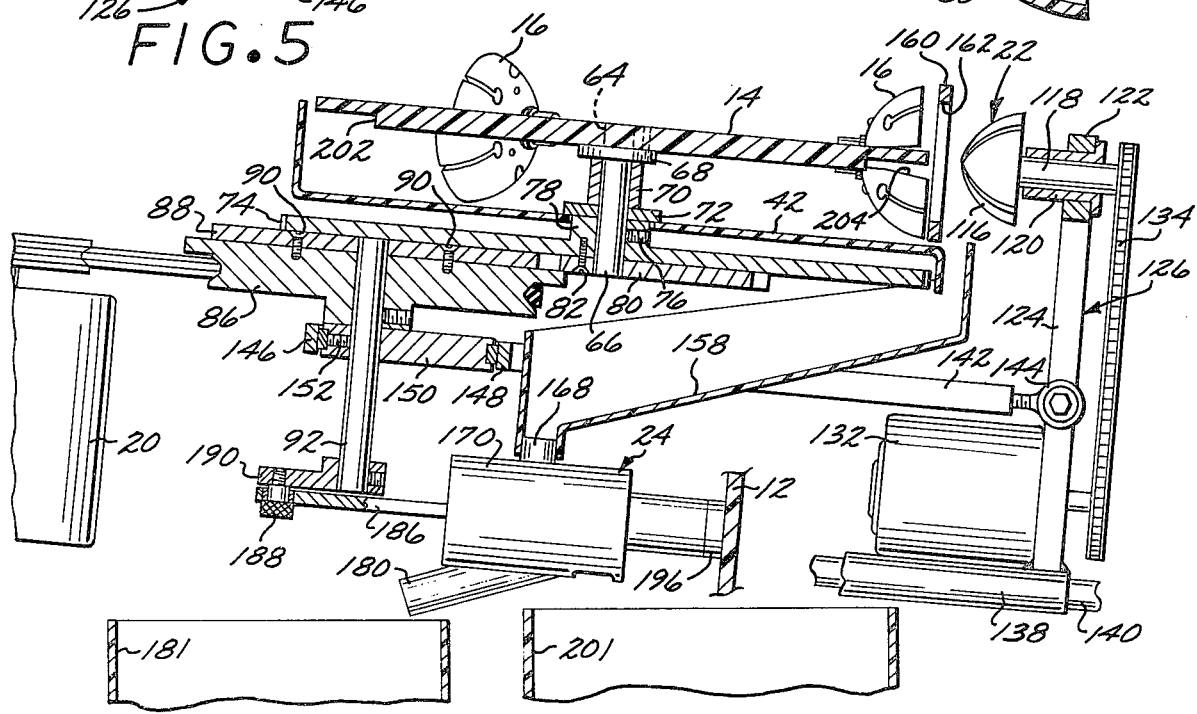

JUICER FOR SEPARATING PULP AND JUICE FROM FRUIT

BACKGROUND OF THE INVENTION

1. Field of the Invention

The present invention relates to a juicer for separating pulp and juice from fruit.

2. Description of the Prior Art

Various juicers are available for separating pulp and juice from fruit. However, most such juicers are incapable of efficient separation of juice from the juice saturated pulp. A typical beverage juicer employs reamers or the like for cutting or abrading cut fruit halves to separate pulp and juice from the rinds or peels. The collected juice is usually immediately served as a beverage, but typically the juice saturated pulp is discarded because a mixture of the juice and the pulp is ordinarily not acceptable to customers. As a consequence, much of the juice is lost in the discarded pulp.

In addition, prior art juicers are often characterized by complex, relatively expensive, short lived, difficult to clean mechanisms for accepting the fruit, slicing it in halves, and subjecting the cut halves to the action of juice and pulp extracting reamers. Moreover, the conveyor systems associated with typical prior art juicers are not reliable in that fruit having flat spots does not automatically roll through such systems and requires continual operator attention.

SUMMARY OF THE INVENTION

According to the present invention, a juicer is provided which includes a juicing means for separating pulp and juice from oranges or like citrus fruit, and a pulper means for receiving juice saturated pulp from the juicing means, compressing it to separate additional juice, and contemporaneously discharging the compressed pulp. The pulper means includes a piston reciprocable in a receptacle toward and away from a backing means which is yieldably movable so that accumulations of compressed pulp are discharged through an opening uncovered upon such yielding movement of the backing means.

The juicer includes a pair of adjacent indexing disks rotatably carried by a juicer frame, and including equal pluralities of generally hemispherical cups, each of the plurality of cups being equally spaced about the circumference of the associated disk, and opening radially outwardly for movement into fruit receiving positions at a fruit receiving station.

In one embodiment of the invention the fruit receiving cups include slots defining gores adapted to flex for receipt of different sizes of fruit. Further, each of the cups preferably includes inwardly directed projections adapted to engage the fruit to prevent relative rotation of the fruit within its cup.

The juicer also includes means for oppositely rotating the indexing disks in intermittent fashion by a device such as a Geneva wheel to successively bring corresponding, complemental cups into opposition to hold the fruit, move it past cutting means, move the cut halves to juicing stations and, finally, move the cups past discharge openings into which the rinds can fall.

The cut halves at the juicing stations are acted upon by a pair of reamers carried by a reamer assembly movable inwardly and outwardly in timed relation to rotation of the indexing disks.

Other objects and features of the invention will become apparent from consideration of the following description taken in connection with the accompanying drawings.

BRIEF DESCRIPTION OF THE DRAWINGS

FIG. 1 is a top plan view of a juicer according to the present invention;

FIG. 2 is a view taken along the line 2—2 of FIG. 1;

FIG. 3 is a view taken along the line 3—3 of FIG. 2;

FIG. 4 is an enlarged view taken along the line 4—4 of FIG. 3;

FIG. 5 is an enlarged view taken along the line 5—5 of FIG. 1;

DESCRIPTION OF THE PREFERRED EMBODIMENT

General Arrangement

Figure 6:
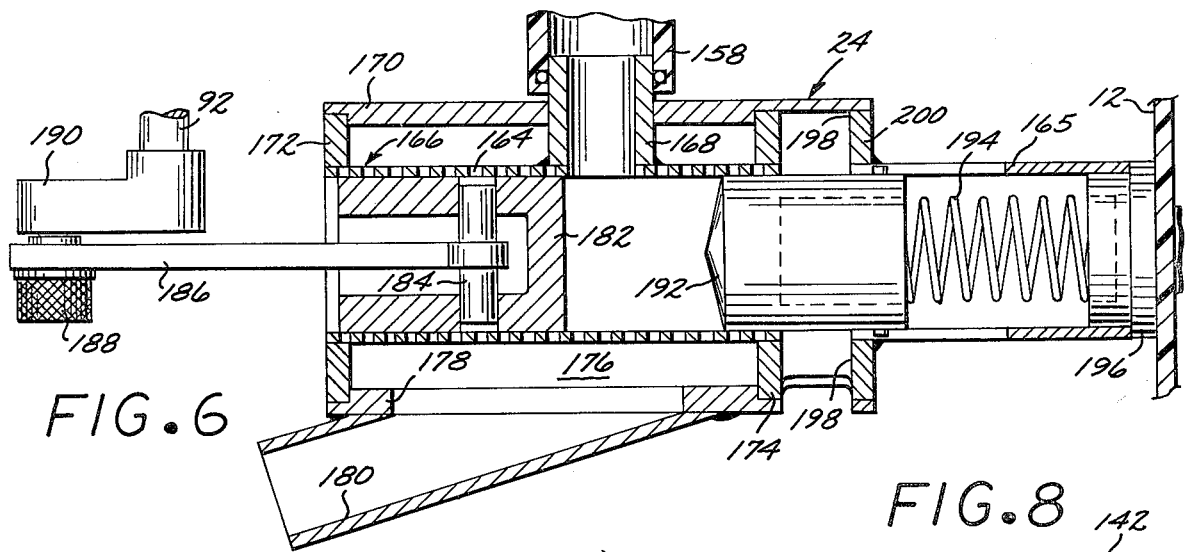
FIG. 6 is an enlarged longitudinal cross-sectional view of the pulper means.

Referring now to the drawings, and particularly to FIGS. 1 through 5, there is illustrated a juicer 10 for separating pulp and juice from fruit such as oranges. The juicer 10 accomplishs this result without squeezing the peel or rind, thereby eliminating any unpleasant taste of rind oil in the juice.

Although the juicer 10 may take various forms, the particular embodiment described is a relatively compact juicer for use in small commercial establishments to produce fresh juice for immediate consumption. Such a juicer is customarily operated a day at a time and then disassembled and cleaned for the next day's operation. It is constructed in such a way that such disassembly and cleaning can be done quickly and easily. However, the constructional details which make this possible will be obvious to those skilled in the art and therefore are omitted for brevity. For example, the juicer 10 is typically configured to set upon a counter or cart (not shown) with space provided underneath for receptacles to collect the fruit juice, compressed pulp, and discarded fruit peels or rinds. An aesthetically attractive, easily separable base and cover of brightly colored plastic material are employed to protect and close off the internal working components from contaminants, the cover being transparent to show the juicing operation. However, for brevity only the functional portions of the base and cover are shown. Further, the juicer 10 includes a frame 12 to which various juicer components are mounted but, again, for brevity only portions of the frame 12 are illustrated.

The major working components of the juicer 10 include a pair of adjacent, horizontally oriented indexing disks 14 rotatably carried by the frame 12 and including fruit receiving cups 16. The disks 14 are rotatable in opposite directions by a disk rotating means 18 which comprises a main drive motor 20 that is operative to move a juicing means 22 into position for removal of juice and juice saturated pulp from the fruit, and also operative to drive a pulper means 24 for receiving juice saturated pulp from the juicing means 22, compressing it for further juice extraction, and contemporaneously discharging the compressed pulp. A conveyor means 26 is included to move the fruit into the indexing disk cups 16.

CONVEYOR MEANS

Any conveyor means effective to place fruit within the receiving cups 16 will operate satisfactorily with the present juicer 10. The preferred form of conveyor means 26 is best seen in FIGS. 1 through 3, comprising a generally cylindrical container 28 supported to one side of the disks 14 by any suitable means. The container 28 is closed at its bottom by a circular base 30 which is downwardly tipped or inclined in the direction of the disks 14.

The base 30 is continuously rotatable by any suitable drive motor (not shown), and is characterized by a plurality of radially extending ridges or raised portions constituting agitators 32 which bump against and continuously agitate fruit 34 located within the container 28.

The wall of the container 28 includes an opening 36 adjacent the base 30, as best seen in FIG. 2, through which individual fruit 34 can pass for entry into an inclined conveyor trough or tube 38 integral with the container 28. The opening 36 is sized to reject any fruit too large for receipt within the cups 16.

The lower extremity of the tube 38 terminates adjacent an inclined depression or trough 40 which is molded into the surface of a generally horizontally oriented tray 42 covering most of the juicer components and acting as a collector for juice and pulp separated from the fruit 34. As will be seen, the dejuiced peels or rinds drop down through one or more discharge openings 44 located in the forward portion of the tray 42 for collection in a trash or garbage bin.

The trough 40 communicates with a right angular, inwardly directed trough section 46 which at its entry end is elevated relative to the trough 40, as seen in FIG. 3, but which inclines downwardly from that point and terminates at a position located between the indexing disks 14. This position constitutes a fruit receiving station, as generally indicated at 48 in FIG. 1.

The fruit 34 is moved one at a time from the lower trough 40 into the higher initial portion of the inclined trough section 46 by a tripper mechanism which forms part of the conveyor means 26. The mechanism is characterized by an elongated arm 50 fixed at one end to the tray 42 by suitable fasteners 44, and curved at the other end to define an arcuate tripper 52 adapted to underlie an individual fruit 34. A vertically oriented pin 54 projects through an opening in the tray 42 and engages the underside of the arm 50. The pin 54 is slidably retained in a bushing 55 attached to the underside of the tray 42 and is periodically moved upwardly, by a means hereinafter described, to raise the tripper 52 and move the individual fruit 34 on the tripper 52 from the trough 40 to the trough section 46 for rolling movement toward the fruit station 48. As will be seen, the pin 54 is actuated at predetermined intervals to move the individual fruit 34 to the fruit receiving station 48 in timed relation with rotation of the indexing disk 14, as will be seen.

With the foregoing arrangement it has been found that fruit is easily and automatically conveyed from the hopper or container 28 without operator intervention, except for periodic refilling of the container 28.

INDEXING ASSEMBLY

The indexing assembly includes the pair of adjacent indexing disks 14 which, in turn, each include three of the generally hemispherical cups 16. The three cups 16 are equally spaced about the circumference of the associated disk, and each cup 16 opens radially outwardly for receipt of fruit at the fruit receiving station 48. The adjacent, generally confronting cups 16 at the station 48 are adapted to enclose and hold the contained individual fruit 34 as the disks 14 rotate the confronting cups 16 past the fruit receiving station 48.

As best seen in FIG. 4, each cup 16 includes slots 56 which define gores 58 between the slots 56. The cups 16 are made of any suitable, relatively resilient plastic material to enable the gores 58 to flex inwardly and outwardly for receipt of fruit of different sizes.

Each cup 16 is also provided with inwardly directed projections in the form of headed pins or rivets 60 whose inwardly directed shank ends are in position to engage and penetrate fruit pressed into the cup. This arrangement prevents the fruit from rotating relative to the cup 16 which, as will be seen, is important during the juicing operation.

The cups 16 fit within complemental cut-outs in the disks 14, each cup 16 being secured to the periphery of its disk 14 by a pair of machine screws 62, only one of which is illustrated in FIG. 4. These extend through counter-sunk openings in the base of the cup 16 and into complemental threaded openings in the disk edge.

Preferably the gores 58 in the upper hemispherical portion of each cup 16 are shorter than their lower counterparts. This facilitates entry of larger size fruit into the cups 16 since the effective entry space is larger.

Referring now to FIG. 5, the disks 14 are located above the tray 42 and each includes a central opening through which extends a reduced diameter portion 64 of an indexing shaft 66. An upper collar 68 integral with the shaft 66 is pinned to and supports the associated disk 14, being rotatable upon a bushing 70 which is fixedly supported by a cross member 72 forming part of the juicer frame 12.

One of the indexing shafts 66 is rotated by an intermittent drive gear 74 fixed to the shaft 66 by a set screw 76 extending through a boss 78 integral with the gear 74 and engaged upon the shaft 66.

Figure 7:
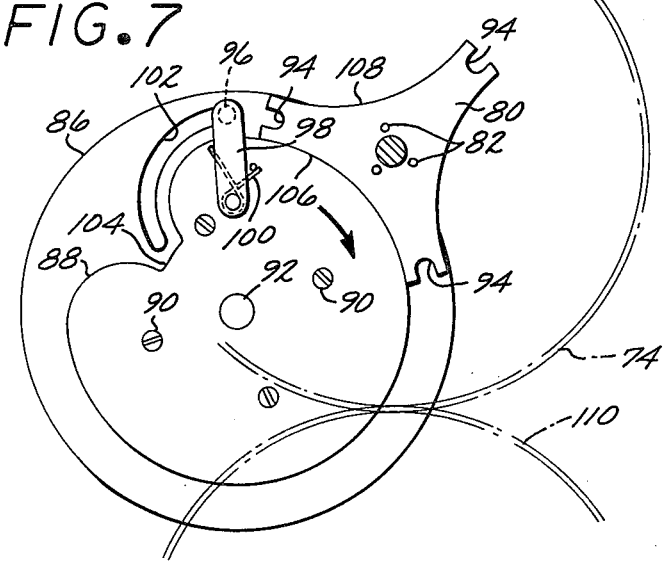
FIG. 7 is a view taken along the line 7—7 of FIG. 5.

A three armed Geneva gear or wheel 80, illustrated in phantom outline in FIG. 7, is attached to the underside of the intermittent drive gear 74 by three machine screws 82, the arms being located at 120° intervals about the circumference of the wheel 80. As is well known to those skilled in the art, a Geneva wheel is a mechanism adapted to translate continuous rotation of a drive shaft into intermittent partial rotation of a shaft such as the indexing shaft 66. In the present embodiment each intermittent partial rotation is through an angle of 120°, with the shaft 66 coming to a complete halt between such partial rotations. More particularly, the drive motor 20 is operative to continuously rotate an associated pulley 84, as best seen in FIG. 5, and this continuous rotation is imparted by a V-belt drive 84 to a drive pulley 86 which is attached by a set screw to a shaft 92.

The drive pulley 86 is attached to the underside of a cam guide 88 by machine screws 90 and the Geneva wheel 80, drive pulley 86, and cam guide 88 cooperate to produce intermittent, partial rotations of the indexing disks 14.

The Geneva wheel 80 of the present embodiment includes a radial slot 94 in each of its arms. In addition, a roller 96 adapted to fit successively within each slot 94 is rotatably carried at one end of an elongated link 98. The other end of the link 98 is pivotally carried by the cam guide 88. The link 98 is biased or spring loaded by a spring 100 so that its outer extremity tends to pivot in a clockwise direction within an arcuate slot 102 provided in the drive pulley 86. The periphery of the cam guide 88 adjacent the slot 102 includes adjacent curvilinear portions which extend radially inwardly and terminate in a recessed portion or cam dwell 104 located adjacent the inner or counterclockwise extremity of the slot 102.

With this arrangement, during continuous rotation of the cam guide 88 by the drive pulley 86, a dwell period of non-rotation of the disks occurs when the roller 96 is out of engagement with any of the radial slots 94 of the Geneva wheel 80. Further, the arcuate edge contour 106 of the gear 180 is engaged upon the slides over the complemental curved circumference of the cam guide 88, preventing rotation of the Geneva wheel 80 and the associated indexing disk 14.

As rotation of the cam guide 88 continues, the roller 96 moves into engagement with one of the Geneva wheel slots 94 and is carried in a counterclockwise direction, as seen in FIG. 7, along the slot 102, moving radially inwardly in the direction of the cam dwell 104. As this radial inward travel commences, the associated slotted arm of the Geneva wheel 80 follows, rotating the Geneva wheel 80 and its associated indexing disk 14 in a counterclockwise direction. The roller 96 next reaches the cam dwell 104, passes it, and disengages the slot 94. At this point the Geneva wheel and its indexing disk 14 will have rotated through 120°. Further rotation is halted and a dwell period is established by engagement of the arcuate surface of the Geneva wheel 80 with the circular circumference of the cam guide 88. The next 120° rotation occurs upon engagement of the next slot 94 by the roller 96.

The drive gear 74 operates one of the indexing disks 14 and meshes with an adjacent corresponding gear 110, which is illustrated in phantom outline in FIG. 7. The gear 110 is coupled to the other indexing disk 14 for rotating that disk in a direction opposite the direction of rotation of the first disk.

As best seen in FIG. 1, each partial or 120° rotation of the disks 14 places a pair of complemental cups 16 in fruit receiving positions, at the fruit receiving station 48. An individual fruit 34, bumped into the trough section 46 by the tripper 52, rolls into the cups 16. The next 120° rotation of the disks 14 carries the fruit past a blade 112 which forms part of a cutting head fixed to the juicer frame between the disks 14. The blade 112 slices the fruit into halves which are carried to the juicing stations generally indicated at 114 in FIG. 1, in position adjacent the juicing means 22 for separation of juice and pulp from the fruit rinds.

JUICING MEANS

The juicing means 22 comprises a pair of augers or reamers 116 of generally hemispherical shape and characterized by ridges for cutting, abrading and separating juice and pulp from the fruit rind. As best seen in FIGS. 5 and 8 through 11, each reamer 116 is carried by a shaft 118 which is rotatable within a bushing 120. The bushing 120 is carried by a cross member 122 attached at its opposite ends to upright members 124, the members 122 and 124 forming a part of a reamer frame or assembly 126.

The reamer shafts 118 mount sprockets 128 which are rotatable by a drive sprocket 130 coupled to a drive motor 132 carried by the reamer assembly 126. The drive sprocket 130 acts through a chain 134 trained about the sprockets 130 and 128 and about an idler or take-up sprocket 136.

The lower ends of the reamer assembly upright members 124 are fixed to a pair of elongated, horizontally oriented frame bushings 138, respectively, which receive and are slidable along the length of a pair of slide bars 140. The bars 140 are suitably fixed at their opposite ends of the juicer frame 12. The bushings 138 support the reamer assembly 126 during the inward and outward travel of the assembly which moves the reamers 116 into and out of juice and pulp separating positions relative to the fruit halves in the cups 16.

Figure 10:
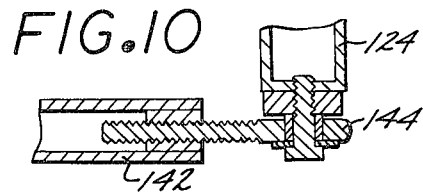
FIG. 10 is a view taken along the line 10—10 of FIG. 9.
Figure 9:
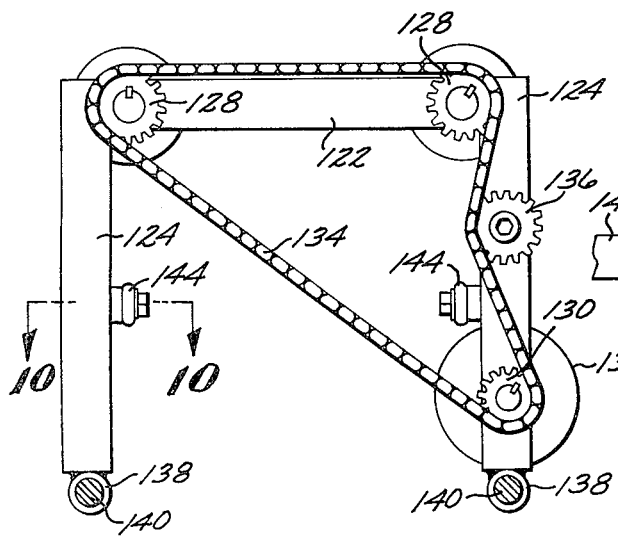
FIG. 9 is a view taken along the line 9—9 of FIG. 5.
Figure 11:
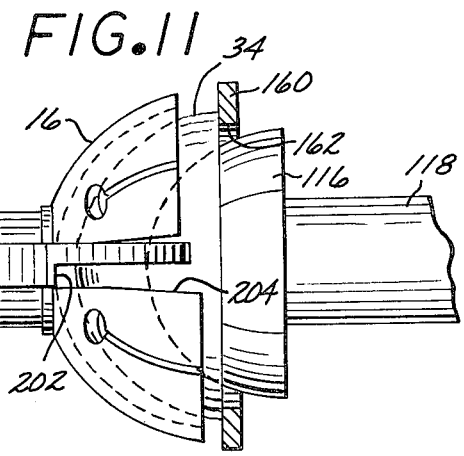
FIG. 11 is an enlarged side elevational view of one of the fruit receiving cups at the juicing station, also illustrating the extractor mechanism for stripping a fruit rind from a reamer.

As best seen in FIGS. 5 and 10, the reamer assembly 126 is moved inwardly and outwardly by a pair of tie rods 142 threadably coupled at their outer extremities to a pair of tie rod ends 144 mounted to the reamer assembly upright members 124. The rod ends 144 are threadable inwardly and outwardly of the tie rods 142 for precisely adjusting the location of the reamers 116 relative to the cups 16 in the juicing stations 114.

Figure 8:
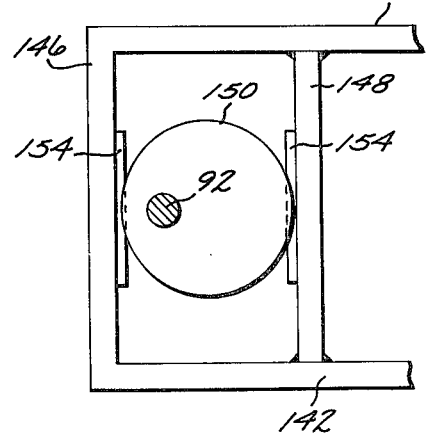
FIG. 8 is a view taken along the line 8—8 of FIG. 5.

As best seen in FIG. 8, the inner extremities of the tie rods 142 are attached to longitudinally spaced apart transverse members 146 and 148 forming part of the reamer assembly 126. A circular disk 150 is located in the space between the transverse members 146 and 148, and it is attached in off-center or eccentric relation to the shaft 92 by means of a set screw 152.

A pair of elongated, low friction rub rails or bearing elements 154 are attached to the reamer assembly transverse members 146 and 148 and slidably fit within a complemental groove provided in the periphery of the disk 150. Upon rotation of the drive pulley 86, the consequent rotation of the shaft 92 and eccentric rotation of the disk 150 reciprocates the reamer assembly 126 inwardly and outwardly in timed relation to partial rotations of the indexing disks 14.

Inward movement of the reamers 116 engages the fruit halves in the cups 16. The fruit halves are kept from rotating in the cups 16 by the rivets 60, and the rotating reamers therefore quickly and easily cut and abrade the fruit to separate juice and juice saturated pulp from the fruit rinds. This mixture flows along the surface of the tray 42, over a downwardly turned tray lip 156, through an opening 154, as best seen in FIG. 1, and into an inlet conduit 158 leading to the pulper means 24, as seen in FIG. 5.

When the reamers 116 commence their outward movement, the rinds remaining in the cups 16 may tend to prematurely drop out, or may adhere to the surface of the reamers 116 and move outwardly with them. Such premature outward movement of the rinds is prevented by engagement of the rinds with a vertically oriented extractor or stripping plate 160, as seen in FIGS. 1 and 5. The plate 160 is suitably attached to the tray 42 immediately adjacent the cups 16 in the juicing stations 114.

The reamers 116 pass through openings 162 provided in the stripper plate 160, but the fruit rinds engage the margins of the openings 162, thereby disengaging from the reamers 116, in position to drop down into a pair of rind openings 44 provided in the forward corners of the tray 42.

A means is provided for positively ejecting the rinds from the cups 16 once they have moved past the stripper plate 160. As best seen in FIGS. 1 and 5, each indexing disk 14 is undercut to provide a reduced diameter portion 204. Further, each of the cups 16 includes a relatively wide horizontal slot between its upper and lower gores 58, as generally indicated at 204 in FIGS. 4 and 5. A pair of cams 206 are mounted in any suitable fashion to the juicer frame 12. Each projects inwardly into engagement with the circumference of the reduced diameter portion 202. Each cam 206 is characterized by an arcuate cam surface 208 which terminates in a rounded leading edge 210. As a cup 16 moves into position adjacent a cam 206, the leading edge 210 passes through the groove 204 in the cup 16, and engages the fruit rind. The fruit rind then rides along the cam surface 208, becoming separated from the cup 16 and dropping into one of the rind openings 44. The rinds are collected in suitable receptacles (not shown) located below the openings 44.

PULPER MEANS

As best seen in FIGS. 5 and 6, the pulper means 24 comprises a strainer receptacle 166 having a plurality of apertures 164. The receptacle 166 includes an inlet 168 in communication with the inlet conduit 158 extending downwardly from the tray 42.

A larger diameter containment sleeve 170 is arranged in coaxial, surrounding relation to the receptacle 166 to define an annular space 176 which is closed at its ends by a pair of annular end members 172 and 174. Juice from the receptacle 166 can drain into the space 176, and from there through a lower opening 178 to a juice collection conduit 180 which empties into a suitable juice collection tank 181.

Juice saturated pulp falling or flowing into the strainer receptacle 166 through the inlet 168 is compressible by a pulper piston 182 which mounts a piston pin 184. One end of a piston rod 186 is connected to the pin 184 and the opposite end is pivotally connected by a knurled connector nut 188 to a crank arm 190. The arm 90 is rigidly attached to the lower end of the drive pulley shaft 92 so that the piston 182 is moved through compression strokes in timed relation to the movement of the other juicer components coupled to the drive pulley shaft 92.

On each piston compression stroke, juice saturated pulp in the strainer receptacle 166 is urged inwardly. When the piston 182 passes and closes off the inlet 168, the juice saturated pulp is compressed against the face of a backing piston 192 arranged in opposed relation to the piston 182 and reciprocable within a cylindrical extension 165 of the strainer receptacle 166.

The backing piston 192 is engaged by one end of a compression spring 194 and inwardly biased toward the piston 182. The opposite end of the spring 194 acts against a spring retainer 196 which is fixed to an end wall of the cylindrical extension 165. The end wall, in turn, is rigidly attached by any suitable means to the fixed juicer frame 12.

The bias of the spring 194 normally urges the backing piston 192 inwardly sufficiently to close off an annular discharge space 198 defined within the annular space 176 by the end member 174 and by an adjacent axially spaced apart end member 200. The discharge space 198 is downwardly open to empty into a suitable compressed pulp receptacle 201.

On successive compressions of the juice saturated pulp located between the pistons 182 and 192, the compressed pulp will accumulate and move the backing piston 192 outwardly against the bias of the spring 194 until the backing piston 192 uncovers the discharge space 198. The compressed pulp will then pass out of the strainer receptacle 166, into the discharge space 198, and into the pulp receptacle 201.

Compression of the juice saturated pulp by the present juicer 10 significantly increases the amount of juice obtainable from a given quantity of fruit, the increase amounting to as much as 40% over the amount obtainable with most prior art juicers which simply collect the juice and discard the juice saturated pulp.

OPERATION

Summarizing the operation of the juicer 10, fruit 34 placed within the container 28 tends to roll through the opening 36, aided by the bumping action of the agitators 32. Fruit movement through the tube 38 stops when an individual fruit 34 is located over the tripper 52.

The tripper 52 is operated in timed relation to movement of the reamer assembly 126 so that the individual fruit 34 is flipped onto the trough section 48, in position to roll by gravity to the fruit receiving station 48.

The timed movement of the tripper 52 is effected, as best seen in FIG. 2, by engagement of the lower end of the pin 54 upon the horizontal leg of a right angular bracket 212 which mounts a tubular bushing 214. A pin rotatably disposed through the bushing 214 is fixed at its opposite ends to portions of the juicer frame, which is generally indicated by the numerals 12. The vertical leg of the right angular bracket 212 is periodically engagable by the transverse member 146 of the reamer assembly 126. Such engagement occurs each time the reamer assembly moves to the left, as viewed in FIG. 5. This pivots the bracket 212, and upwardly moves the pin 54 to flip the individual fruit onto the trough section 48.

Continuous rotation of the drive pulley 86 by the drive motor 20 is converted by the mechanism associated with the Geneva wheel 80 into intermittent partial rotations of the indexing disks 14.

On commencement of a partial rotation of the indexing disks 14, the cups 16 move away from the fruit receiving station 14 into enclosing relation about the individual fruit 34 at that station, and past blade 112. The partial rotation terminates with the fruit halves located at the juicing stations 114. At this point the reamer assembly 126, moving inwardly in timed relation with the actuation of the disks 14 because of common coupling to the drive pulley 86, brings the reamers 116 through the openings 162 of the stripper plate 160 and against the fruit halves. Juice and pulp are separated. Upon outward movement of the reamer 126, the fruit rinds are stripped from the reamers 116 by the stripper plate 160. During the next partial rotation, the rind containing cups 16 are moved from the juicing stations 114, the rinds are positively ejected from the cups 16 by the stripping action of the cams 206. The ejected rinds fall downwardly through the openings 44.

Juice and juice saturated pulp resulting from the foregoing operation flow into the strainer receptacle 166 of the pulper means 24. Juice immediately flows from the receptacle 166, through the conduit 180 and into the tank 181.

Juice saturated pulp remaining in the strainer receptacle 166 is compressed between the pistons 182 and 192 through successive reciprocations of the pulper piston 182 until sufficient compressed pulp accumulates to urge the backing piston 192 outwardly to uncover the discharge opening 198. The compressed pulp then passes out of the discharge space 198 and into the receptacle 201.

In operation the juicer 10 has been found to be extremely easy to use, relatively simple to operate, characterized by long service life, and especially efficient in optimizing juice recovery from fruit.

Various modifications and changes may be made with regard to the foregoing detailed description without departing from the spirit of the invention.

I claim:

1. A juicer comprising:
   juicing means for separating pulp and juice from fruit; and
   pulper means including a pulp receptacle having an inlet for receiving juice saturated pulp from said juicing means, juice passage means adapted to pass juice from said pulp receptacle and block discharge of pulp from said pulp receptacle, and an outlet for discharge of pulp from said pulp receptacle, said pulper means further including backing means located in said pulp receptacle, bias means biasing said backing means toward a projected position closing said outlet, said backing means being movable against said bias means into a retracted position opening said outlet, said pulper means further including a pulper piston reciprocable in said pulp receptacle between a retracted position, enabling entry of juice saturated pulp into said pulp receptacle through said inlet, and a projected position closing said inlet for compressing juice saturated pulp in said pulp receptacle against said backing means whereby juice may pass through said juice passage means, and pulp may be discharged through said outlet upon movement of said backing means against said bias means and into said retracted position responsive to accumulation of compacted pulp against said backing means resulting from successive reciprocations of said pulper piston.

2. A juicer according to claim 1 wherein said juice passage means comprises a plurality of apertures enabling the escape of juice.

3. A juicer according to claim 1 wherein said backing means comprises a backing piston in confronting relationship to said pulper piston and reciprocable in said pulp receptacle, and said bias means comprises a spring.

4. A juicer according to claim 1 and including conveyor means for conveying fruit to said juicing means, said conveyor means comprising a fruit receptacle for fruit, said fruit receptacle having a laterally opening discharge outlet; a rotatable, generally circular base in said fruit receptacle inclined toward said discharge outlet whereby round fruit tend to roll into said discharge outlet and characterized by a plurality of radially directed protuberances projecting out of said base and adapted to engage and bump fruit in said fruit receptacle whereby the fruit may be agitated and swept toward said discharge outlet; and drive means for rotating said base.

5. A juicer comprising:
   juicing means for separating pulp and juice from fruit; and
   conveyor means for conveying fruit to said juicing means, said conveyor means comprising a fruit receptacle for fruit, said fruit receptacle having a laterally opening discharge outlet; a rotatable generally circular base in said fruit receptacle inclined toward said discharge outlet whereby round fruit tend to roll into said discharge outlet and characterized by a plurality of radially directed protuberances projecting out of said base and adapted to engage and bump fruit in said fruit receptacle whereby the fruit may be agitated and swept toward said discharge outlet; and drive means for rotating said base.

6. A juicer comprising:
   a juicing means for separating pulp and juice from fruit; and
   pulper means including a strainer receptacle having apertures for passing juice and blocking pulp, having an inlet for receiving juice saturated pulp, and further having an outlet for discharging compressed pulp; a backing piston on said strainer receptacle; bias means biasing said backing piston inwardly toward closure of said outlet; a pulper piston in said receptacle in opposed relation to said backing piston, said pulper piston being movable inwardly toward said backing piston to close said inlet and compress any juice saturated pulp located between said pulper piston and said backing piston whereby juice may escape through the apertures in said strainer receptacle, and whereby the resulting compressed pulp tends to urge said backer piston outwardly toward said outlet for eventual escape of said compressed pulp out of said outlet, said pulper piston being movable outwardly away from said backer piston to open said inlet and allow a fresh quantity of juice saturated pulp to enter said strainer receptacle; and drive means for reciprocating said pulper piston inwardly and outwardly within said strainer receptacle.

7. A juicer according to claim 6 wherein said juicing means comprises:
   a juicer frame;
   a pair of substantially horizontally oriented, adjacent indexing disks rotatably carried by said frame and including equal pluralities of generally hemispherical cups, each of said plurality of cups being equally spaced about the disk circumference and opening radially outwardly, said indexing disks being rotatable in substantially horizontal planes in opposite directions to bring corresponding, complemental ones of said cups on said disks into successive positions constituting a fruit receiving station for lateral receipt of fruit, juicing stations, and rind discharge stations, each of said cups including slots defining gores adapted to flex for receipt of different sizes of fruit halves, the lower ones of said gores projecting beyond the upper ones of said gores to support small fruit halves that have slid down away from the upper ones of said gores;
   fruit feed means operative to laterally roll fruit into said fruit receiving station;
   cutting means located between said fruit receiving station and said juicing stations for halving fruit in said cups;
   a reamer assembly having a plurality of reamers and movable inwardly and outwardly to engage said reamers upon fruit halves in said cups in said juicing stations for separating juice and pulp from the fruit rinds, and to disengage said fruit, respectively, to enable movement of said cups containing said fruit rinds toward said rind discharge stations;

drive means continuously rotatable and including eccentric means operative to move said reamer assembly inwardly and outwardly; and intermittent motion means interconnected between said drive means and said indexing disks and operative to move said disks successively to said fruit receiving station, said juicing stations, and said rind discharge stations with a dwell period at each.

8. A juicer according to claim 7 wherein said intermittent motion means comprises a Geneva wheel mechanism.

9. A juicer according to claim 7 wherein the interior of each of said cups include outwardly directed projections adapted to engage fruit and prevent rotation of said fruit relative to said cups.

10. A juicer according to claim 7 and including a stripper plate adjacent said juicing stations and having openings through which said reamers are movable, said stripper plate being sufficiently close to said cups in said juicing stations to engage fruit rinds which may adhere to said reamers upon movement of said reamer assembly outwardly, thereby preventing separation of said fruit rinds from said cups until said cups have moved past said stripper plate.

11. A juicer according to claim 7 and including means defining a fruit receiving depression adjacent said fruit receiving station; and tripper means in said depression operable to flip fruit in said depression upwardly for passage to said fruit receiving station.

12. A juicer according to claim 7 wherein said drive means is coupled to said pulper means for operation of said compression means in timed relation to inward and outward movement of said reamer assembly.

13. A juicer according to claim 7 including a pair of stripper cams adjacent said indexing disks, respectively, located between said juicing stations and said rind discharge stations and operative to pass through said cups rotating beyond said juicing stations to engage and separate fruit rinds in said cups.

* * * * *